United States Patent
Kapadia et al.

(10) Patent No.: US 6,956,875 B2
(45) Date of Patent: Oct. 18, 2005

(54) TECHNIQUE FOR COMMUNICATING VARIABLE BIT RATE DATA OVER A CONSTANT BIT RATE LINK

(75) Inventors: Maneck Behram Kapadia, Indianapolis, IN (US); Jayanta Majumdar, Carmel, IN (US); James Zhiming Zhang, Indianapolis, IN (US)

(73) Assignee: Atlinks USA, Inc., Indianapolis, IN (US)

( * ) Notice: Subject to any disclaimer, the term of this patent is extended or adjusted under 35 U.S.C. 154(b) by 0 days.

(21) Appl. No.: 10/174,893

(22) Filed: Jun. 19, 2002

(65) Prior Publication Data

US 2003/0235219 A1 Dec. 25, 2003

(51) Int. Cl.[7] .................................................. H04J 3/02

(52) U.S. Cl. ..................... 370/538; 370/539; 370/540; 370/543; 370/544

(58) Field of Search ................................. 370/503, 508, 370/509, 516–519, 532–545

(56) References Cited

U.S. PATENT DOCUMENTS

| | | | | |
|---|---|---|---|---|
| 5,793,747 A | * | 8/1998 | Kline ......................... | 370/230 |
| 5,991,811 A | * | 11/1999 | Ueno et al. ................. | 709/231 |
| 6,084,889 A | * | 7/2000 | Murakami ................... | 370/474 |
| 6,219,349 B1 | * | 4/2001 | Kobayashi et al. ...... | 370/395.6 |
| 6,324,165 B1 | * | 11/2001 | Fan et al. .................... | 370/232 |
| 6,477,168 B1 | * | 11/2002 | Delp et al. ............... | 370/395.4 |
| 6,507,592 B1 | * | 1/2003 | Hurvig et al. .............. | 370/503 |
| 6,516,002 B1 | * | 2/2003 | Huang et al. ............... | 370/468 |

* cited by examiner

Primary Examiner—Chi Pham
Assistant Examiner—Thai Hoang
(74) Attorney, Agent, or Firm—Joseph S. Tripoli; Robert B. Levy

(57) ABSTRACT

Variable bit rate information is transmitted across a transmission link (20) at a constant bit rate by multiplexing individual variable bit rate elementary data streams ($16_1$ and $16_2$) into a composite data stream (18) having a constant bit rate. A receiving device (22) receives the constant bit rate stream but delays processing thereof by an interval typically a fraction of the transmission interval. Following the delay interval, the receiving device processes the data at a rate that is independent of, but typically not greater than, the constant bit rate.

15 Claims, 3 Drawing Sheets

TECHNIQUE FOR COMMUNICATING VARIABLE BIT RATE DATA OVER A CONSTANT BIT RATE LINK

TECHNICAL FIELD

This invention relates to a technique for communicating variable bit rate information without the need for feedback control.

BACKGROUND ART

Many types of digital devices send and receive digital information streams. Such information streams can include video, audio and/or data, in original or compressed form. Each information stream includes at least one Elementary Data Stream (EDS), and often a plurality of EDSs, which when multiplexed together yield a Composite Data Stream (CDS). Often, one or more of the EDSs has a Variable Bit Rate (VBR), causing the CDS to have a variable bit rate. In practice, many transmission links, especially medium and long haul links, carry data at a Constant Bit Rate (CBR), even if the data originated as a VBR stream.

A composite data stream transmitted across a CBR transmission link undergoes processing at one or more receiving devices located at the far end of the transmission link. Many receiving devices often process incoming data at a variable rate as determined by a synchronization process implemented in the receiving device. At the outset of synchronization, the receiving device will de-multiplex the EDSs from the CDS and buffer each EDS. Thereafter, the receiving device will decode a time stamp within each EDS and then present the time stamp for comparison to a system clock recovered by a Phase Lock Loop (PLL) from clock references embedded in the CDS. Assuming a match between the system clock and the time stamp, the packet then undergoes decompression, if previously compressed, and thereafter undergo rendering. Such rendering can include display by a display device, or subsequent processing, such as by a CODEC. The embedded clock references and time stamps constitute control data that provides synchronization among the all of the EDSs in the CDS.

The synchronization process described above determines the processing rate of a CDS having a variable bit rate. If the receiving device processing rate does not correlate with the CBR of the incoming CDS and no adjustments are made, then data can become lost or corrupted.

Thus, there is need for a technique for sending data having a variable bit that will minimize loss and corruption.

BRIEF SUMMARY OF THE INVENTION

Briefly, in accordance with present principles, there is provided a method for communicating variable bit rate information. In accordance with the method, a receiving device receives a composite data stream via a transmission link that carries the composite data stream at a constant bit rate not less that highest peak rate of all the elementary data streams comprising the composite data stream. The receiving device waits to process the composite data stream to establish a delay between receipt of a byte in the composite data stream and processing of that byte, the processing occurring at a rate independent of, but typically not greater than the constant bit rate.

DETAILED DESCRIPTION

Figure 1:
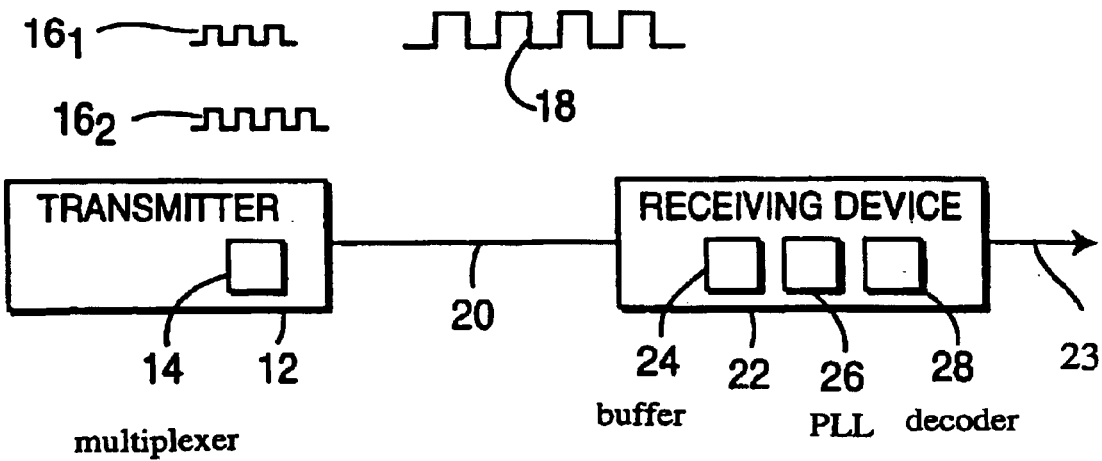
FIG. 1 depicts a block schematic diagram of a transmitter-receiving device pair in accordance with the prior art.

FIG. 1 depicts a block schematic diagram of a communications system 10 according to the prior art. In its simplest form, the system 10 comprises a transmitter 12 that includes a multiplexer 14 for combining a plurality of Elementary Data Streams (EDSs), illustratively represented by streams $16_1$ and $16_2$, into a Composite Data Stream (CDS) 18. The transmitter 12 transmits the CDS across a link 20 to a receiving device 22 at a Constant Bit Rate (CBR) that is not lower than the highest peak rate of the EDSs $16_1$ and $16_2$.

Figure 2:
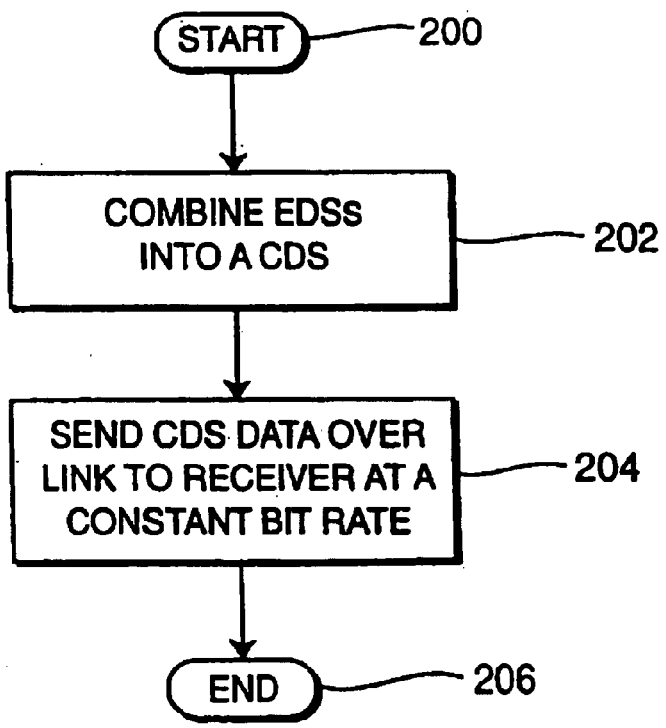
FIG. 2 depicts in flow chart form the steps of a process undertaken by the transmitter of FIG. 1 to transmit a Composite Data Stream (CDS)

FIG. 2 depicts in flow chart form the steps of a process undertaken by the transmitter 12 of FIG. 1 to transmit the CDS 18 to the receiving device 22 of FIG. 1. The transmission process of FIG. 2 commences upon execution of the Start step 200 during which the transmitter initializes itself if needed. Thereafter, the transmitter 14 of FIG. 2 combines the Elementary Data Streams (EDSs) $16_1$ and $16_2$ into the CDS 18 during step 202 of FIG. 2. During step 202, the transmitter 14 will compress and/or encode the CDS 18, if necessary, using one of a variety of known techniques. Finally, the transmitter 14 transmits the CDS 18 over the link 20 at the CBR to the receiving device 22 of FIG. 1 during step 204 of FIG. 2 after which the transmission process ends (step 206).

Referring to FIG 1, the receiving device 22 processes the CDS 18 to yield an output data stream 23 for rendering, such as for display on a display device (not shown) or for processing by a CODEC (not shown) or other device. As discussed in greater detail hereinafter, the receiving device 22 advantageously buffers each byte in a buffer 24 for at least a brief interval before processing to achieve synchronization. In that regard, the receiving device 22 includes a clock and phase-lock loop circuit 26 for synchronizing the processing of each EDS (e.g., EDSs $16_1$ and $16_2$) following de-multiplexing of the CDS 18. As discussed above, the transmitter 14 will typically compress and/or encode the CDS 18 transmitted to the receiving device 22. For that reason, the receiving device includes-circuitry 28 for decoding and/or de-compressing the bytes in the de-multiplexed bit stream.

Figure 3:
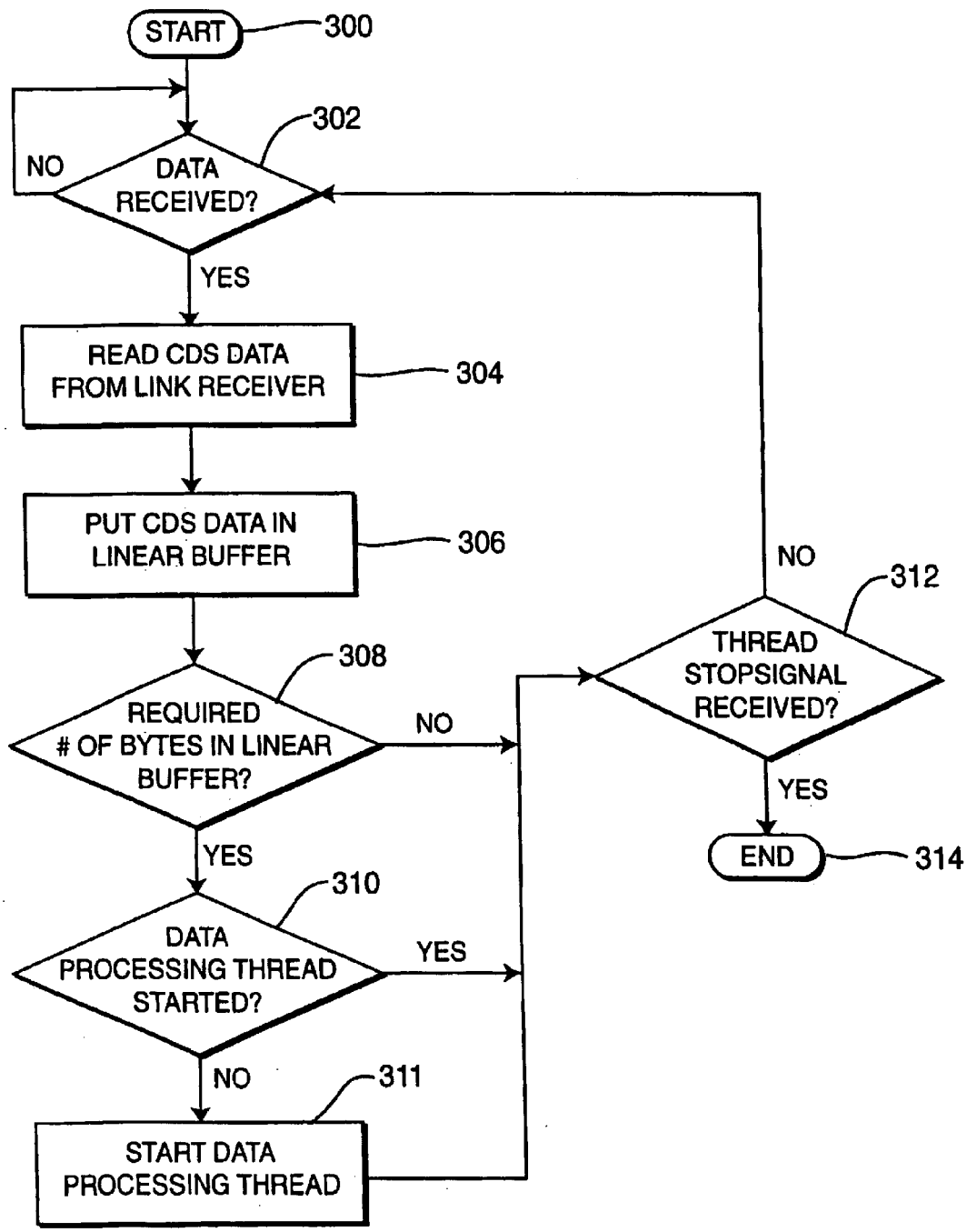
FIG. 3 depicts in flow chart form the steps of a process undertaken by the receiving device of FIG. 1 to receive the CDS.

FIG. 3 depicts in flow chart form the steps of a process undertaken by the receiving device 22 of FIG. 1 to receive the CDS 18 transmitted by the transmitter 12. The reception process of FIG. 3 commences upon execution of the Start step 300 during which the receiving device 22 initializes itself as necessary. Thereafter, the receiving device 22 of FIG. 1 makes a determination during step 302 of FIG. 3 whether additional data exists on the link 20 of FIG. 1 for reception. If no additional data yet exists, the receiving device 22 re-executes step 302. Upon determining that one or more bytes of the CDS 18 now exist on the link 20, the receiving device 22 reads the data on the link during step 304 of FIG. 3. Thereafter, the receiving device 22 loads the bytes of the CDS 18 into the buffer 24 of FIG. 1 during step 306.

Following step 306, a check is made during step 308 of FIG. 3 whether the buffer 24 holds the requisite number bytes to commence processing. If so, then a check is made during step 310 whether data processing has commenced. When data processing hasn't yet commenced, then program execution branches to step 311, whereupon data processing commences. Following execution of step 311, step 312 occurs during which the receiving device 22 of FIG. 1 checks for the receipt of a stop signal. Execution of Step 312 also occurs following step 308 when the receiving device 22 determines it has not received a sufficient number of bytes. Further, execution of step 312 also occurs after step 310 when the receiving device 22 has determined that data processing has commenced. After detecting a stop signal program execution ends (step 314). Otherwise, in the absence of a stop signal, program execution branches to step 302 and those following it.

Figure 4:
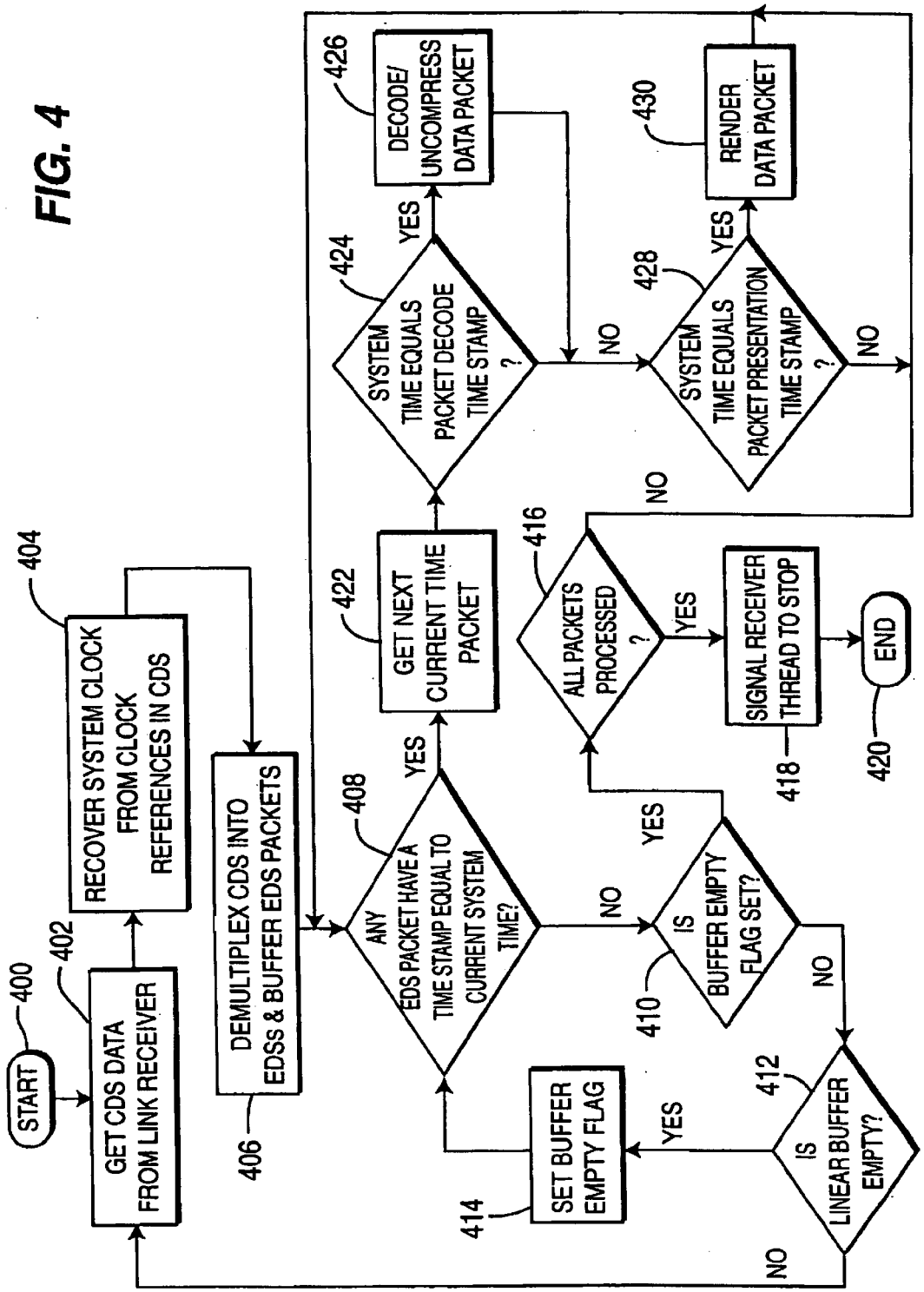
FIG. 4 depicts in flow chart form the steps of a process undertaken by the receiving device of FIG. 1 to process the received CDS for rendering.

FIG. 4 depicts in flow chart form the steps of the method executed by the receiving device 22 of FIG. 2 to process the bytes in the CDS 18, and in particular, to achieve synchronization. The data processing method of FIG. 4 commences upon execution of the Start step 400 during which the receiving device 22 initializes itself for processing to the extent necessary. Following step 400, step 402 occurs during which the receiving device 22 of FIG. 1 reads the buffer 26 of FIG. 1 to obtain the stored CDS byte(s). Next, the receiving device 22 recovers system clock data form clock references embedded within the CDS byte during step 404. After step 404, the receiving device 22 of FIG. 1 de-multiplexes the CDS byte(s) into its constituent Elementary Data Stream (EDS) byte(s) and thereafter buffers the packets within each EDS during step 406.

Step 408 occurs next during which the receiving device 22 checks whether any EDS packet has a time stamp that corresponds to the current system time. If no packet has such a time stamp, then the receiving device 22 checks during step 410 whether a buffer empty flag has been set to indicate that the buffer 24 of FIG. 1 containing the EDS packets is empty. Should the buffer empty flag remain unset when checked during step 410, the receiving device 22 undertakes a check during step 412 whether the buffer is actually empty. Upon finding the buffer empty during step 412, then the receiving device 22 of FIG. 1 sets the buffer empty flag during step 414 before program execution branches to step 408.

Upon finding the buffer empty flag set during step 410, then program execution branches to step 416 during which time the receiving device 22 checks for completion of packet processing. If so, then the receiving device 22 of FIG. 1 stops processing during step 418, whereupon program execution ends (step 420). Upon finding that packets remain for processing during step 416, then program execution branches back to step 408.

If, during step 408, an EDS packet is found to have time stamp equals the current system time, then the receiving device 22 retrieves the next current time packet during step 422. Thereafter, a check is made during step 424 whether the system time matches a decode time stamp for the packet. If so, then packet decoding/de-compression occurs during step 426. Following step 426, or following step 424 when no packet has a decode time equal to the system time stamp, then a check is made during step 428 whether the packet under consideration has a presentation time stamp matching the system time. If so, then program execution branches to step 430 during which packet rendering occurs, i.e., display of the packet or subsequent processing, such as by a CODEC or the like. In the event the system time does not equal the packet presentation time, then program execution branches to step 408.

The processing undertaken by the receiving device 22, as described in connection with the flow chart of FIG. 4, occurs independently of the rate at which the transmitter 12 sends data, although in practice, the receiving device processing rate should not exceed the transmission rate. In this way, the receiving device 22 will not run out of data before the end of the transmission of the CDS 18. Otherwise, when the processing rate exceeds the transmission rate, the receiving device 22 can ultimately under run the transmitter 12. To the extent that intervals occur when the receiving device peak processing rate exceeds the transmission rate, the intial delay between receipt of the first packet and processing thereof should be increased, or the transmission rate should be increased. Note that buffering of the entire CDS 18 before the start of processing by the receiving device 22 is unnecessary. All that is necessary is for the receiving device 22 to start processing after an initial delay period.

The foregoing describes a technique for communicating variable bit rate over a constant bit rate link.

What is claimed is:

1. A method for communicating variable bit rate information, comprising the steps of:

receiving at a receiving device a composite data stream transmitted across a link at a constant bit rate not less than a highest peak rate of a set of variable bit rate elementary data streams that comprise composite data stream;

delaying processing at the receiving device of the composite data stream by a delay interval; and processing the composite data stream at the receiving device after said delay interval to synchronize packet decoding at the receiving device with a current system time, the processing occurring at a rate independent of the constant bit rate and including the steps of:

recovering from the composite data stream clock references;

de-multiplexing the composite data stream into constituent elementary data streams;

determining if any elementary data stream has a packet with a time stamp matching the current system time, and if so, determining whether the packet has a packet decode stamp matching the current system time, and if so, then decoding the packet;

determining if the packet has a presentation time stamp matching the current system time, and if so, rendering the packet.

2. The method according to claim 1 wherein the processing rate of the receiving device does not exceed the constant bit rate.

3. The method according to claim 1 wherein the delay interval is increased if there exists a period during which the constant bit rate does not exceed a peak receiving device processing rate.

4. The method according to claim 1 wherein the receiving step includes the sub-steps of:

storing successive bytes of the composite data stream in a buffer;

checking whether a prescribed number of bytes have been stored; and ceasing the storage of bytes once a prescribed number of bytes have been received.

5. The method according to claim 1 wherein the step of rendering the packet includes displaying the packet.

6. The method according to claim 1 wherein the step of rendering the packet includes further processing the packet via a CODEC.

7. A method for communicating variable bit rate information, comprising the steps of:
- transmitting a composite data stream across a link at a constant bit rate, not less than a highest peak rate of a set of variable bit rate elementary data streams that comprise composite data stream;
- receiving the composite data stream at a receiving device;
- delaying processing at the receiving device of the composite data stream by a delay interval; and
- processing the composite data stream at the receiving device after said delay interval to synchronize packet decoding at the receiving device with a current system time, the processing occurring at a rate independent of the constant bit rate at which the composite data stream is transmitted and including the steps of:
- recovering from the composite data stream clock references;
- de-multiplexing the composite data stream into constituent elementary data streams;
- determining if any elementary data stream has a packet with a time stamp matching the current system time, and if so,
- determining whether the packet has a packet decode stamp matching the current system time, and if so, then decoding the packet;
- determining if the packet has a presentation time stamp matching the current system time, and if so,
- rendering the packet.

8. The method according to claim 7 wherein the step of transmitting the composite data stream includes the step of multiplexing a plurality of elementary data streams to yield the composite data stream.

9. The method according to claim 7 wherein the processing rate of the receiving device does not exceed the constant bit rate at which the composite data stream is transmitted.

10. The method according to claim 7 wherein the delay interval is increased if there exists a period during which the constant bit rate does not exceed a peak receiving device processing rate.

11. The method according to claim 7 wherein the receiving step includes the sub-steps of:
- storing successive bytes of the composite data stream in a buffer;
- checking whether a prescribed number of bytes have been stored; and
- ceasing the storage of bytes once a prescribed number of bytes have been received.

12. The method according to claim 7 wherein the step of rendering the packet includes displaying the packet.

13. The method according to claim 7 wherein the step of rendering the packet includes further processing the packet via a CODEC.

14. Apparatus for receiving variable bit rate information, comprising:
- a receiving device that receives composite data stream transmitted across a link at a constant bit rate not less than a highest peak rate of a set of elementary data streams that comprise composite data stream;
- the receiving device having a buffer for storing at least a portion of the composite data stream; and
- the receiving device delaying processing the composite data stream by a delay interval; and following the delay interval, the receiving device processing the composite data stream at a rate independent of the constant bit rate to synchronize packet decoding at the receiving device with a current system time, the receiving device processing the data stream by the steps of:
- and including the steps of:
- recovering from the composite data stream clock references;
- de-multiplexing the composite data stream into constituent elementary data streams;
- determining if any elementary data stream has a packet with a time stamp matching the current system time, and if so,
- determining whether the packet has a packet decode stamp matching the current system time, and if so, then decoding the packet;
- determining if the packet has a presentation time stamp marching the current system time, and if so,
- rendering the packet.

15. A communications system, comprising:
- a transmitter for transmitting a composite data stream across a link at a constant bit rate not less than a highest peak rate of a set of variable bit rate elementary data streams that comprise composite data stream;
- a receiving device that receives composite data stream transmitted across a link at a constant bit rate not less than a highest peak rate of a set of elementary data streams that comprise composite data stream;
- the receiving device having a buffer for storing at least a portion of the composite data stream; and
- the receiving device delaying processing the composite data stream by a delay interval; and following the delay interval, the receiving device processing the composite data stream at a rare independent of the constant bit rare to synchronize packet decoding at the receiving device with a current system time, the receiving device processing the data stream by the steps of:
- and including the steps of:
- recovering from the composite data stream clock references;
- de-multiplexing the composite data stream into constituent elementary data streams;
- determining if any elementary data stream has a packet with a time stamp matching the current system time, and if so,
- determining whether the packet has a packet decode stamp marching the current system time, and if so, then decoding the packet;
- determining if the packet has a presentation time stamp marching the current system time, and if so,
- rendering the packet.

* * * * *